United States Patent
Foti et al.

(10) Patent No.: US 11,337,139 B2
(45) Date of Patent: May 17, 2022

(54) ENFORCEMENT OF SERVICE EXEMPTION ON A PER ACCESS NETWORK TECHNOLOGY TYPE

(71) Applicant: TELEFONAKTIEBOLAGET LM ERICSSON (PUBL), Stockholm (SE)

(72) Inventors: George Foti, Dollard des Ormeaux (CA); Ralf Keller, Würselen (DE)

(73) Assignee: TELEFONAKTIEBOLAGET LM ERICSSON (PUBL), Stockholm (SE)

(*) Notice: Subject to any disclaimer, the term of this patent is extended or adjusted under 35 U.S.C. 154(b) by 0 days.

(21) Appl. No.: 16/967,654

(22) PCT Filed: Feb. 15, 2019

(86) PCT No.: PCT/IB2019/051254
§ 371 (c)(1),
(2) Date: Aug. 5, 2020

(87) PCT Pub. No.: WO2019/159132
PCT Pub. Date: Aug. 22, 2019

(65) Prior Publication Data
US 2020/0383033 A1 Dec. 3, 2020

Related U.S. Application Data

(60) Provisional application No. 62/631,182, filed on Feb. 15, 2018.

(51) Int. Cl.
*H04W 48/02* (2009.01)
*H04W 76/16* (2018.01)
*H04W 88/06* (2009.01)

(52) U.S. Cl.
CPC .......... *H04W 48/02* (2013.01); *H04W 76/16* (2018.02); *H04W 88/06* (2013.01)

(58) Field of Classification Search
CPC ....... H04W 4/24; H04W 48/02; H04W 48/18; H04W 48/10; H04W 88/06; H04W 92/02; H04W 8/20
(Continued)

(56) References Cited

U.S. PATENT DOCUMENTS

| 8,412,195 | B2 * | 4/2013 | Yuk | H04W 88/06 455/435.1 |
| 8,934,898 | B2 * | 1/2015 | Yuk | H04W 92/02 455/435.1 |

(Continued)

FOREIGN PATENT DOCUMENTS

| EP | 3267650 | A1 | 1/2018 |
| EP | 3753299 | A1 * | 12/2020 | ............ H04W 88/06 |

(Continued)

OTHER PUBLICATIONS

A solution framework to provide management services for wireless communications in the digital home by Ramon Ferrus; Oriol Sallent; Jordi Perez-Romero; Ramon Agusti Published in: IEEE Communications Magazine (vol. 50, Issue: 11, pp. 132-141) Nov. 2012 (Year: 2012).*

(Continued)

*Primary Examiner* — William D Cumming

(57) ABSTRACT

Method and apparatus relating to determining the services exempted from being blocked when accessing a communication system based on the one or more access network of different technology type supported by a wireless device are provided. The method is performed at the wireless device that supports more than one access network technology type (3GPP, non-3GPP) and comprises obtaining on a per access network technology type, one or more list of services exempted from being blocked when accessing the system using a particular access network type and providing to the communication system over each access network used by (Continued)

the wireless device, information indicating an activity status related to exempting services from being blocked in accordance with the technology type of each of the supported access network.

13 Claims, 7 Drawing Sheets

(58) Field of Classification Search
USPC .............. 455/434, 435.1; 370/328, 329, 338
See application file for complete search history.

(56) References Cited

U.S. PATENT DOCUMENTS

| | | | | |
|---|---|---|---|---|
| 9,049,643 | B2* | 6/2015 | Lee | H04W 48/10 |
| 2011/0085498 | A1* | 4/2011 | Oba | H04W 48/18 |
| | | | | 370/328 |
| 2012/0178448 | A1* | 7/2012 | Yuk | H04W 88/06 |
| | | | | 455/435.1 |
| 2013/0130681 | A1* | 5/2013 | Lee | H04W 48/10 |
| | | | | 455/434 |
| 2013/0142151 | A1* | 6/2013 | Yuk | H04W 88/06 |
| | | | | 370/329 |
| 2013/0287014 | A1* | 10/2013 | Yuk | H04W 88/06 |
| | | | | 370/338 |
| 2019/0246436 | A1* | 8/2019 | Kim | H04L 65/1069 |
| 2019/0357090 | A1* | 11/2019 | Drevon | H04W 4/24 |
| 2020/0221286 | A1* | 7/2020 | Gan | H04W 8/20 |
| 2020/0288515 | A1* | 9/2020 | Gupta | H04W 48/02 |
| 2020/0383033 | A1* | 12/2020 | Foti | H04W 48/02 |

FOREIGN PATENT DOCUMENTS

| | | | | |
|---|---|---|---|---|
| WO | 2015158363 | A1 | 10/2015 | |
| WO | WO-2018086416 | A1 * | 5/2018 | ............ H04W 48/08 |
| WO | WO-2019159132 | A1 * | 8/2019 | ............ H04W 88/06 |

OTHER PUBLICATIONS

D. Astely, E. Dahlman, G. Fodor, S. Parkvall and J. Sachs, "LTE release 12 and beyond [Accepted From Open Call]," in IEEE Communications Magazine, vol. 51, No. 7, pp. 154-160, Jul. 2013, doi: 10.1109/MCOM.2013.6553692. (Year: 2013).*

3GPP TS 23.401 V15.2.0 (Dec. 2017), Technical Specification, 3rd Generation Partnership Project; Technical Specification Group Services and System Aspects; General Packet Radio Service (GPRS) enhancements for Evolved Universal Terrestrial Radio Access Network (E-UTRAN) access (Release 15).

3GPP, "3rd Generation Partnership Project; Technical Specification Group Services and System Aspects; Procedures for the 5G System; Stage 2 (Release 15)" TS 23.502 V15.0.0, Dec. 2017.

Nokia et al. "Providing the UE with a per PLMN list of PS Data Off exempted services" SA WG2 Meeting #120, S2-171779, Mar. 31, 2017 (Mar. 27-31, 2017, Busan, South Korea).

Orange, Huawei, "Solution for Key issues 2 and 3" SA WG2 Meeting #116BIS, S2-164685, Aug. 29-Sep. 2, 2016, Sanya, P. R China.

ISR and Written Opinion from corresponding application PCT/IB2019/051254.

* cited by examiner

ENFORCEMENT OF SERVICE EXEMPTION ON A PER ACCESS NETWORK TECHNOLOGY TYPE

RELATED APPLICATION

This application claims the benefit of provisional patent application Ser. No. 62/631,182, filed Feb. 15, 2018, the disclosure of which is hereby incorporated herein by reference in its entirety.

TECHNICAL FIELD

The disclosure relates to traffic management, control of services, and access network technology types.

BACKGROUND

Packet Service, PS Data off is a feature specified in Third Generation Partnership Project, 3GPP, that prevents transport via Packet Data Network, PDN, connections in 3GPP access networks of all IP packets except IP packets required by 3GPP PS Data off Exempt Services. The 3GPP PS Data Off Exempt Services are a set of operator services, defined in 3GPP Technical Specification, TS 23.221, that are the only allowed services when the 3GPP PS Data Off feature has been activated by the user. The following are example of operator services that can be part of the 3GPP PS Data Off Exempt Services: MMTel Voice; SMS over IMS; USSD over IMS (USSI); MMTel Video; Particular IMS services not defined by 3GPP, where each such IMS service is identified by an IMS communication service identifier; Device Management over PS; Management of USIM files over PS (e.g. via Bearer Independent Protocol); and IMS Supplementary Service configuration via the Ut interface using XCAP.

User Equipments, UEs, may be configured with up to two lists of 3GPP PS Data Off Exempt Services and the list(s) are provided to the UEs by the home network or Home Public Land Mobile Network, HPLMN, via Device Management or UICC provisioning. When a UE is configured with two lists, one list is valid for the UEs camping in the HPLMN and the other list is valid for any Visited PLMN, VPLMN, the UE is roaming in. When the UE is configured with a single list, without an indication to which PLMNs the list is applicable, then this list is valid for the HPLMN and any PLMN the UE is roaming in. 3GPP PS Data Off may be activated based on roaming status, and the HPLMN may configure up to two sets of 3GPP PS Data Off Exempt Services for its subscribers: one is used when in HPLMN and another when roaming.

PS Data off is currently specified in the Evolved Packet System, EPS, as specified in 3GPP TS 23.401. The EPS comprises Core network elements including a Mobility Management Entity, MME, a Serving Gateway, SGW and a packet data network gateway, PDN GW. The UE discovers whether a PDN GW supports 3GPP PS Data Off feature at initial UE attach as described in clause 5.3.2.1 of 3GPP TS 23.401 and during the establishment of a PDN connection as described in clause 5.10.2 of 3GPP TS 23.401 via the presence of the 3GPP PS Data Off Support Indication in the Create Session response message sent from the PDN GW to the MME via the SGW to indicate the PDN GW has accepted establishment of the EPS bearer between the UE and the PDN GW.

The UE reports its 3GPP PS Data Off status in Protocol Configuration Option, PCO, to the PDN GW during the Initial Attach procedure and UE requested PDN connectivity procedure.

If 3GPP PS Data Off is activated, the UE prevents the sending of uplink IP packets except those related to 3GPP PS Data Off Exempt Services, based on the pre-configured list of Data Off Exempt Services.

If a PDN GW indicates support for the 3GPP PS Data Off feature during PDN connection setup and at Initial Attach, the UE shall report immediately a change of its 3GPP PS Data Off status in PCO by using Bearer Resource Modification procedure as described in clause 5.4.5 of 3GPP TS 23.401. If the UE has not received any 3GPP PS Data Off Support Indication during the establishment of the PDN connection, it shall not report any change of its 3GPP PS Data Off Status for this PDN connection.

The behavior of the PDN GW for 3GPP PS Data Off is controlled by local configuration or policy from the policy server, i.e., 3GPP PCRF as defined in 3GPP TS 23.203. More specifically, the PCRF is configured with the list of 3GPP PS Data Off Exempt Services and the event trigger of 3GPP PS Data Off status change. The event trigger is used to inform the PCRF about every change of the 3GPP PS Data Off status. The PCRF can be configured with a list of 3GPP PS Data Off Exempt Services per APN. The list of 3GPP PS Data Off Exempt Services for an APN can also be empty, i.e., allowing any service within that APN, according to operator policy.

The PCRF can be configured with up to two lists of 3GPP PS Data Off Exempt Services for UEs in HPLMN and for UEs camping in any VPLMNs.

For the PDN connection used for IMS services, the 3GPP Data Off Exempt Services are enforced in the IMS domain as specified in 3GPP TS 23.228.

The UE can be made aware of the PS Data off exempt services using a management object, MO, (using for e.g., OMA DM) where the non-SIP services are identified by an APN and an uplink filter to be enforced by the UE and the SIP (IMS) based services to be exempted are identified by enumeration (MMTel Voice, SMS over IMS, USSD over IMS, MMTel Video) or by IMS communication service identifier. The UE enforces originating SIP based requests based on these.

Another solution described in 3GPP TR 23.702 allows only the list of exempted services for the VPLMN (including the HPLMN in non roaming cases) to be provisioned at the HSS and sent to the UE during the attachment to that VPLMN. Therefore, placing this knowledge in a single entity (the HSS) that provides the UE, the S-CSCF and the PGW with the exempted services with the corresponding format avoids the need for coordination between databases (e.g. OMA DM and HSS). Another solution to make the UE aware of the list of PS Data off exempted services is described in 3GPP TS 23.702 and include making use of the USSD mechanism.

SUMMARY

The existing solutions for 3GPP PS Data off enables exempting services only on 3GPP access. In addition, the 3GPP PS Data off exempts services based on the roaming status where the UE and the network are only configured with up to two lists of 3GPP PS Data Off Exempt Services: one contains the exempted services when the UE is in the HPLMN and the other list contains the exempted services when the UE is in any VPLMN. However, since UEs support 3GPP access (e.g., LTE, 5G) and non-3GPP access (e.g., WiFi) and may simultaneously access to the core network via 3GPP and non-3GPP accesses, a solution is provided to exempt services not only based on the roaming status but also based on the access network technology type (i.e., 3GPP such as LTE, 5G and non-3GPP such as WiFi).

According to one aspect, a method performed by a wireless device relating to determining exempted services from being blocked when accessing a communication system over one or more access network of different technology type is provided, the method comprises obtaining on a per access network technology type supported by the wireless device, one or more list of services exempted from being blocked when using a particular access network type and providing to the communication system over each access network used by the wireless device, information indicating an activity status related to exempting services from being blocked in accordance with the technology type of each of the access network used by the wireless device.

In accordance with another aspect, the method further comprises the wireless device connecting to the communication system simultaneously over more than one access network of different technology type.

In accordance with another aspect, the information indicating an activity status for services related to exempting services from being blocked further comprises indicating whether the wireless device has enabled or disabled a capability to exempt services from being blocked over the access network technology type.

In accordance with yet another aspect, the one or more list of exempted services comprises a list of services exempted from being blocked for each access network of different technology type supported by the wireless device and to be applied when the wireless device is connected to the communication system in a Home Public Land Mobile Network, HPLMN.

In another aspect, the one or more list of exempted services comprises a list of exempted services to be applied for each access network of different technology type supported by the wireless device and to be applied when the wireless device is connected to the communication system in a Visited Public Land Mobile Network, VPLMN.

In accordance with another aspect, the wireless device connecting to the communication system further comprises simultaneously connecting to the HPLMN over one access network of a first technology type and to a VPLMN over a different access network of a different technology type.

In accordance with another aspect, the one access network is a 3G PP access network and the different access network is a non-3G PP access such as Wireless local Area network.

In accordance with another aspect, a wireless device adapted to perform any of the embodiments of the method provided herein.

In accordance with another embodiment, a wireless device, comprises one or more transceivers and circuitry connected to the one or more transceivers, the circuitry is operable to cause the wireless device to perform any of the embodiments of the method provided herein.

In another embodiment, a wireless device comprises one or more modules that are operable to perform any of the embodiments presented herein.

In accordance with one aspect, a method of operation of a user plane network entity in a communication system of enforcing use of services by the wireless device, the method comprises obtaining for each access network technology type, at least one list of services exempted from being blocked for the wireless device and exempting traffic related to the services from the at least one list of exempted services from being blocked for one or more connections of the wireless device established over one or more access network technology type.

In accordance with another aspect, the method further comprises providing for a wireless device, information indicating an activity status related to exempting services from being blocked in accordance with the technology type of each of the access networks supported by the wireless device.

In accordance with another aspect, the method at the user plane network entity comprises obtaining on a per access network technology type at least one list of services exempted from being blocked further comprises obtaining on a per access network technology type a list of services exempted from being blocked in the Home Public Land Mobile Network, HPLMN and a list of services exempted from being blocked in a Visited PLMN, VPLMN. The method may further comprise providing for the wireless device at initial attach or packet data unit establishment the list of services to be exempted from being blocked on a per access network technology type.

In accordance with another aspect, the method at the user plane network entity comprises detecting at least one of service data flow or service type corresponding to a service to be exempted for an access network technology type used by the wireless device, and allowing the traffic related to the service to be transmitted to the wireless device over the corresponding access network and blocking any traffic over the access network that does not correspond to any service in the list of services to be exempted from being blocked for the access network technology type.

In accordance with another aspect, a user plane network node in a communication system is adapted to perform any of the embodiments described herein. Alternatively, a user plane network node comprises a network interface, one or more processors and memory that comprises instructions executable by the one or more processors whereby the user plane network node is operable to perform the method of any one the embodiments described herein.

In accordance with another aspect, a method of operation of a control network entity in a communication system of controlling use of services is provided, the method comprises obtaining from a wireless device an indication of a status for exempting services from being blocked in the wireless device based on a technology type of the access network supported or used by the wireless device to access the communication system and providing for the wireless device, information indicating support of exempting services from being blocked in accordance with the technology type of each of the access networks supported or used by the wireless device.

In accordance with another aspect, the method further comprises providing per access network technology type supported or used by the wireless device, at least one list of services exempted from being blocked for the wireless device.

In one aspect, a control network node in a communication system is adapted to perform any embodiments described herein for a control node, such AMF or SMF in a 5G core network. Alternatively, the control network node comprises a network interface, one or more processors and memory that comprises instructions executable by the one or more processors whereby the control network node is operable to perform any of the control network node embodiments described herein.

BRIEF DESCRIPTION OF THE DRAWINGS

The accompanying drawing figures incorporated in and forming a part of this specification illustrate several aspects of the disclosure, and together with the description serve to explain the principles of the disclosure.

DETAILED DESCRIPTION

Figure 1:
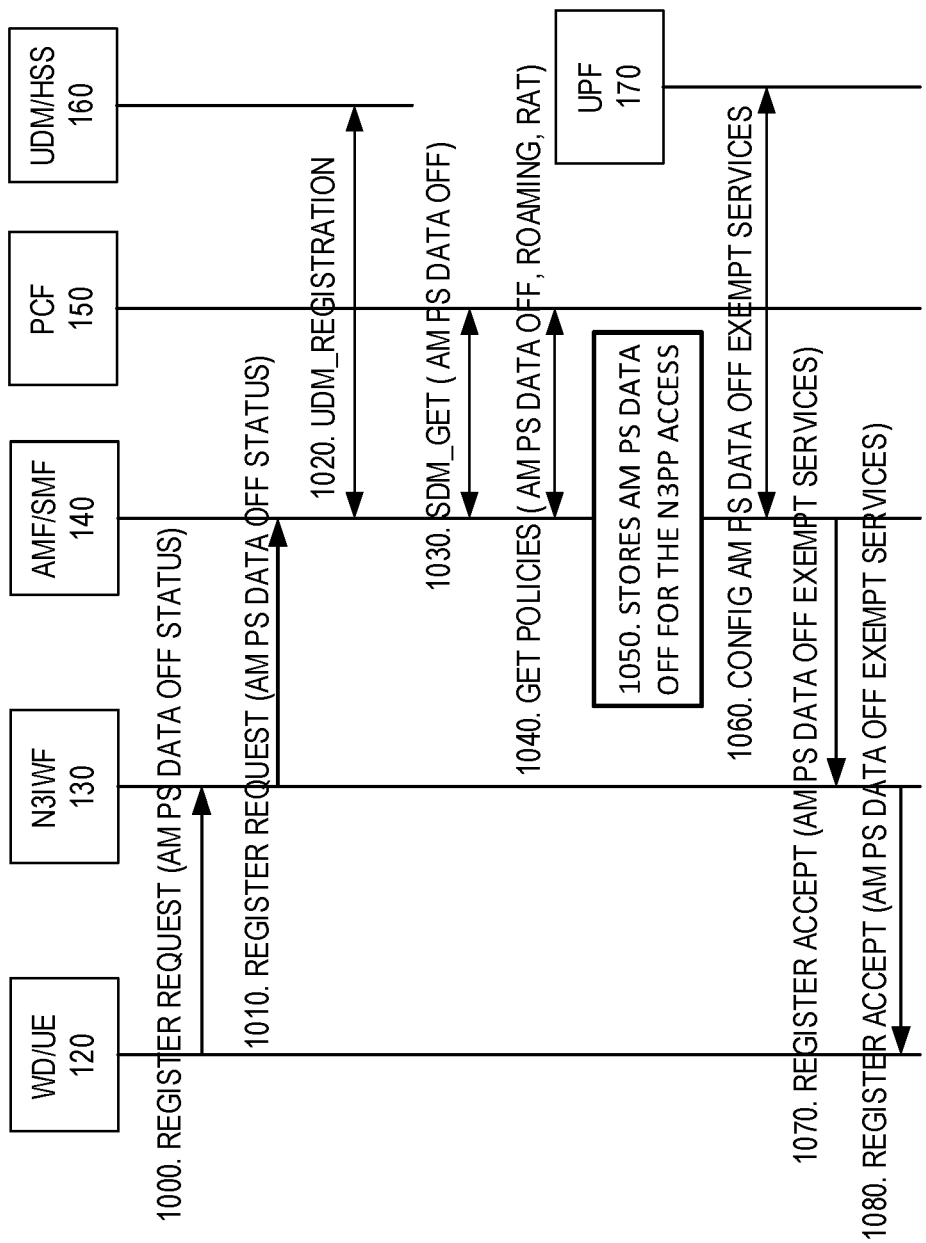
FIG. 1 illustrates a flow diagram for exchanging the PS Data off status between the wireless device and the communications system when the wireless device is accessing the communications system on a non-3GPP access network in accordance with one embodiment.

The embodiments set forth below represent information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to implement such feature, structure, or characteristic in connection with other embodiments whether or not explicitly described.

As used herein, the singular forms "a", "an" and "the" are intended to include the plural forms as well, unless the context clearly indicates otherwise. It will be further understood that the terms "comprises," "comprising," "includes," and/or "including" when used herein, specify the presence of stated features, integers, steps, operations, elements, and/or components, but do not preclude the presence or addition of one or more other features, integers, steps, operations, elements, components, and/or groups thereof.

Wireless device: A wireless device, WD, 12 refers to a device capable, configured, arranged and/or operable to communicate wirelessly with network nodes and/or other wireless devices. Communicating wirelessly may involve transmitting and/or receiving wireless signals using electromagnetic signals, radio waves, infrared signals, and/or other types of signals suitable for conveying information through air. In some embodiments, a WD may be configured to transmit and/or receive information without direct human interaction. For instance, a WD may be designed to transmit information to a network on a predetermined schedule, when triggered by an internal or external event, or in response to requests from the network. Examples of a WD include, but are not limited to, user equipment (UE), smart phone, mobile phone, cell phone, voice over IP (VoIP) phone, wireless local loop phone, desktop computer, personal data assistant (PDA), wireless cameras, gaming terminal devices, music storage, playback appliances, wearable terminal devices, wireless endpoints, mobile stations, tablets, laptops, laptop-embedded equipment (LEE), laptop-mounted equipment (LME), USB dongles, smart devices, wireless customer-premise equipment (CPE) and vehicle-mounted wireless terminal devices. A WD may support device-to-device (D2D) communication, for example by implementing a 3GPP standard for sidelink communication, and may in this case be referred to as a D2D communication device. As yet another specific example, in an Internet of Things (IoT) scenario, a WD may represent a machine or other device that performs monitoring and/or measurements, and transmits the results of such monitoring and/or measurements to another WD and/or a network node. The WD may in this case be a machine-to-machine (M2M) device, which may in a 3GPP context be referred to as a machine-type communication (MTC) device. As one particular example, the WD may be a UE implementing the 3GPP narrow band internet of things (NB-IoT) standard (cellular IoT, CIoT), Wireless Fidelity, WiFi™ standard, Bluetooth, or other. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal. A wired device is similar to a wireless device except it communicates with network nodes over wired interface instead of radio technology.

3GPP Access Network: Is an Access Network that Comprises One or more "3GPP radio access node" or "3GPP radio network node" that operates to wirelessly transmit and/or receive signals. Some examples of a 3GPP radio access node include, but are not limited to, a base station (e.g., a New Radio (NR) base station (gNB) in a 3GPP Fifth Generation (5G) NR network or an enhanced or evolved Node B (eNB) in a 3GPP LTE network), a high-power or macro base station, a low-power base station (e.g., a micro base station, a pico base station, a Home eNB (HeNB), or the like), and a relay node.

Non-3GPP Access Network: is an access network that comprises one or more non-3GPP Access Points that operates to wirelessly or non-wirelessly transmit and/or receive signals. The non-3GPP Access Network may include an Access Controller for controlling the non-3GPP Access Points. Some examples of a non 3GPP Access Points include but are not limited to WiFi Access Points. The non-3GPP Access Network may be trusted or untrusted. When untrusted, the wireless device should establish an IPSec tunnel over the non-3GPP Access Network to tunnel back and forth the traffic to the communication system.

Network Node: As used herein, a "network node" is any node that is either part of the radio access network or the core network of a cellular communications network/system, e.g., MME, PGW, etc. in EPC or Access and Mobility Management Function, AMF, Session Management Function, SMF, Policy Control Function, PCF, User plane Function, UPF etc. in 5G Core network.

Network Function: As used herein, a "network function" is any network function that is either part of the radio access network or the core network of a cellular communications network/system.

A communications system refers to a system that supports multiple access networks, i.e., 3GPP access network and non-3GPP access network. The communication system supports roaming wireless devices and non-roaming wireless devices, in which case the communications system comprises network entities in a home public land mobile network, HPLMN and network entities in the visited PLMN, VPLMN. The HPLMN and VPLMN share roaming agreements.

3GPP PS Data off already refers to the 3GPP specified feature that prevents transport via Packet Data Network, PDN, connections in 3GPP access networks of all IP packets except IP packets required by 3GPP PS Data off Exempt Services. In this disclosure, Multi-Access MA PS Data off refers to the feature that enables exempting services or traffic related to services from being blocked over a particular access network type used by the wireless device. Non-exempted services are therefore blocked from being transmitted over the particular access network. In addition, different services may be exempted over different access network type. MA PS Data Off will be activated for each access network of a technology type (3GPP or non-3GPP) and on roaming status. The HPLMN may configure up to two sets of MA PS Data Off Exempt Services per access network technology type for its subscribers: for each access network technology type supported one is used when in HPLMN and another when roaming. The lists of MA PS Data off exempt services may be configured on a per subscriber, where each subscriber may have a configured list of exempted services per access network technology type when in HPLMN and when roaming. The lists are configured individually per subscriber. The HPLMN may alternatively configure a common list of PS Data off exempt services for each access network technology type in HPLMN and another common list when roaming. The lists of MA PS Data off exempt services may include the same services or may be different services.

The description given herein focuses on a 3GPP communications system and, as such, 3GPP terminology or terminology similar to 3GPP terminology is oftentimes used. However, the concepts disclosed herein are not limited to a 3GPP system. The embodiments are described using the 3GPP 5G core network, 5GC, but it will be apparent that the embodiments can be implemented in a 4G system, such as the evolved Packet System, EPS, but is not limited thereto.

Wireless Device Registration Procedure for Reporting MA PS Data Off Over Non-3GPP Access Network FIG. 1 illustrates a wireless device initiating a registration procedure with the 5GC where the wireless device reports the status of the MA PS Data off and obtaining the status of the MA PS Data off from the 5GC and potentially one or more list of MA PS Data off services exempted from being blocked. FIG. 1 only illustrates the relevant steps of the procedure. It will be apparent to a person skilled in the art that more steps are executed to complete the registration procedure, which are not shown so not to overcrowd the Figure. The detailed steps of a registration procedure in non 3GPP access can be found in 3GPP TS 23.502, V 15.0.0 clause 4.12.2.2

Step 1000: The wireless device 120 after establishing an IKE Security Association with the N3IWF 130 as illustrated in 3GPP TS 23.502 clause 4.12.2.2, sends a NAS Registration Request encapsulated in an IKE_AUTH Request to request access to the 5GC over the Non-3GPP access network (e.g., WLAN). The IKE exchange is not shown in FIG. 1. The NAS Registration Request comprises an indication informing the AMF/SMF 140 on the activation/deactivation of "MA PS Data off" on the Non 3GPP access network as decided by the user. FIG. 1 illustrates a Registration Request from the wireless device 120 but the wireless device 120 can report the information by adding the MA PS Data-Off UE's in other NAS messages such as Service Request, Tracking Area Update Request, etc. If the wireless device 120 is simultaneously registered to 3GPP and non-3GPP access networks, the wireless device 120 would provide over each access network an indication informing the AMF/SMF 140 (different AMF/SMF may be assigned for the different registrations) on the activation/deactivation of "MA PS Data off" on the corresponding access network as decided by the user. The wireless device 120 would maintain a separate indication for each access network of a technology type used to access the 5GC or 5GC and 4G Core. The remaining of the call flow is described when the wireless device 120 indicates activation of MA PS Data off for the currently used access network.

Step 1010: The N3IWF 130 forwards the NAS Registration Request comprising the MA PS Data off indication to the AMF/SM 140.

Step 1020: The AMF/SMF 140 serving the wireless device 120 stores in the wireless device context the wireless device's MA PS Data Off status for the access network used by the wireless device 120 and may forward it to the UDM/HSS 160 (or equivalent function) as shown in step 1020. The UDM/HSS 160 is typically in the user's HPLMN. The UDM/HSS 160 would also receive as part of step 1020 an identity of the AMF/SMF 140 and other information indicating whether the wireless device 120 is roaming. Note that when roaming, the AMF/SMF 140 may in fact be separate entities (the AMF in the VPLMN and the SMF in the HPLMN) or may both be provided in the VPLMN. The message sent to UDM/HSS 160 at step 1020 also includes the access network technology type used by the wireless device 120.

The UDM/HSS 160 may, based on the roaming status and the access network technology type, provide an indication to the AMF/SMF 140 on whether MA PS Data off should be provided for the wireless device 120 over the access network used. Again, that indication may be different for different access network technology used by the wireless device 120. If MA PS Data off is authorized over the access network used, the UDM/HSS 160 may provide at least one access network specific list of services exempted from being blocked over the used access network. The UDM/HSS 160 may include based on the access network used a list of exempted services to be used in HPLMN and another list to be used in the VPLMN if roaming. Alternatively, it may provide only one list of exempted services for the access network used based on the roaming status.

Step 1030: If at step 1020, the AMF/SMF 140 has not received the list of services to exempt over the access network used by the wireless device 120 and has not received the lists of exempted services from the HSS/UDM 160, it sends a request to the PCF 150 to indicate that MA PS Data off has been activated over the access network and provides the access network technology type. An indication on whether the wireless device 120 is roaming is also included. The PCF 150 determines if service exemption on a per access network is enabled on the network side based on the subscriber profile or operator policy. If yes, then the PCF 150 provides the Network MA PS Data off status indicator indicating that the feature is enabled. Else, it indicates the feature on the network side is disabled.

Step 1040: May be executed together with step 1030. The AMF/SMF 140 may query for the list of exempted services or a query for all the lists of exempted services for the wireless device that would comprise the list of exempted services over all the supported access networks in the HPLMN and/or in the VPLMN. Alternatively, the PCF 150 provides only one list of exempted services based on the roaming status and the access network in use by the wireless device 120. The request from the AMF/SMF 140 includes the access network technology type currently used by the wireless device, the roaming status, and the type of query. The list or lists of exempted services obtained from the PCF 150 may override any list that may be provided by the HSS/UDM 160. The PCF 150 may obtain the list(s) of exempted services per access network technology type used by the wireless device 120 from a repository function.

Step 1050: The AMF/SMF 140 stores, for the wireless device 120 for the access network technology used, the one or more list of exempted services received either from the UDM/HSS 160 at step 1030 or from the PCF 150 at step 1040. In addition, it stores the MA PS Data off indication received from the wireless device 120. The Step 1060: the AMF/SMF 140 configures the selected UPF (User plane function) 170 with the necessary filter information received from the UDM/HSS 160 or PCF 150 corresponding to the list of exempted services from being blocked over the connection(s) established by the wireless device 120 over the access network. If the wireless device 120 has established simultaneous connection over 3GPP and non-3GPP access and both connections are anchored in the same UPF 170. The different lists of exempted services per access network type should be configured in the same UPF 170. As the UPF 170 may not be aware of the access network technology type as it only routes IP traffic, other information indicating the exempted traffic routed over the access network should be used, such as the wireless device IP address if different IP addresses are used over the different access networks. In the event the wireless device 120 shares a common IP address across the simultaneous Access networks, an identification of the connection peer could be used to differentiate the traffic over the connections. The UPF 170 may send an acknowledgement to the AMF/SMF 140 once the configuration of the filters is completed or accepted. The UPF 170 enforces the MA PS Data off for the access network by allowing downlink traffic related to the exempted services configured in the UPF 170 to be transmitted to the wireless device 120 over the one or more connections or session(s) established over the corresponding access network, while blocking other traffic.

Step 1070: The AMF/SMF 140 sends a NAS Registration Accept to the N3IWF 130 for forwarding to the wireless device 120. The NAS Registration Accept message includes the status of the network provided MA PS Data off indicating the network is providing and/or authorizing the use of MA PS Data over the access network and may include the one or more list of services exempted from being blocked by the wireless device 120 over the access network in use.

Step 1080: The N3IWF 130 forwards the received message at step 1070 to the wireless device 120 encapsulated in an IKE_AUTH Response message. If the NAS Registration Accept includes the one or more list of services exempted from being blocked by the wireless device 120 over the access network in use, the wireless device 120 installs the related uplink filters as provided in the NAS Registration Accept that will allow uplink traffic related to the exempted services to be transmitted to the UPF 170 while blocking all other non-exempted traffic over the used access network. If the wireless device 120 is simultaneously connected to the communication system via 3GPP and non 3GPP access networks, it would be configured for each access network used with at least one list of exempted services from being blocked. Different services may be exempted over different access network used. In some instances, the same services may be exempted on any access networks used.

Method Embodiments in Wireless Device

Figure 2:
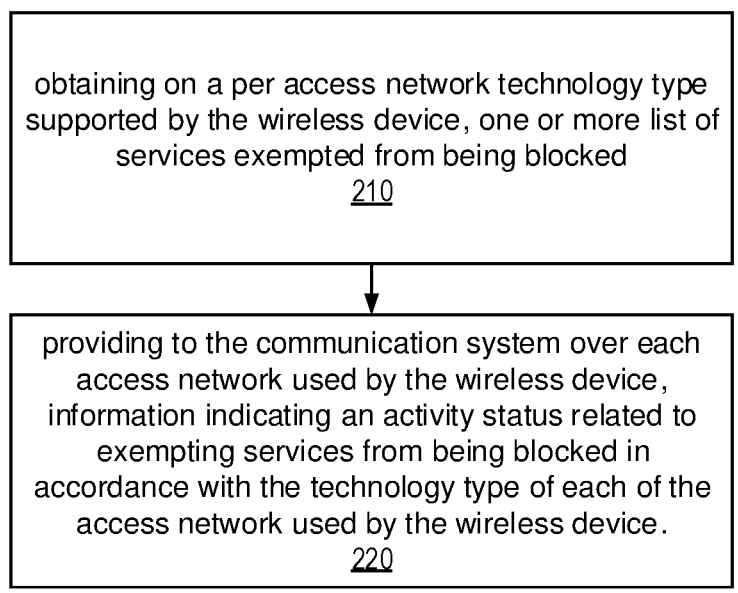
FIG. 2 is a flow chart illustrating a method in the wireless device in accordance with some embodiments of the present disclosure.

FIG. 2 illustrates example embodiments in the wireless device for activating and enforcing MA PS Data off. The method steps are not executed necessarily in the order they are shown. Step 210 describes the step of obtaining at the wireless device for each access network of a technology type (e.g., 3GPP such as 5G, LTE and non-3GPP access such as WiFi) used or supported by the wireless device, at least one list of services exempted from being blocked over the access network. For each access network technology type (or RAT) is provided a list of exempted service when the wireless device is in the HPLMN and/or another list of exempted services when the wireless device is roaming. The wireless device could be obtaining the list(s) of exempted service via either device management mechanism (e.g., OTA, OMA DM, Managed Object), or in response to reporting to the communication system (e.g., 5GC or EPC) the wireless device MA PS Data off status indicating if the wireless device has activated the capability to exempt services from being blocked over the corresponding access network used to access the communication system, i.e., in response to Step 220. The wireless device may thus obtain the list(s) of exempted services in response to a registration/attach request, tracking/service area update, Service request, etc. Basically, any request to the communication system that would result in establishment or modification or assignment of a user plane. The list(s) obtained for each access network technology type may include the same services to be exempted or may include different set of services based on the access network technology type.

The list(s) of services obtained for an access network may include a set of filter parameters (uplink parameters) to be installed and mapped to the connection(s) once established over the corresponding access network. It may also include service IDs, if the list consists of SIP based services, in which case the list may be provisioned at the SIP client instead and mapped to the corresponding access network connection(s).

At step 220, the wireless device performs the step of reporting to the communication system (e.g., 5GC or EPC) the wireless device MA PS Data off status indicating if the wireless device has activated the capability to exempt services from being blocked over the corresponding access network used to access the communication system. The wireless device may report the MA PS Data off status indicator in a registration/attach request, tracking/service area update, Service request, etc., basically, any request to establish the communication system that would result in establishment or modification or assignment of a user plane. The wireless device may maintain separate MA PS Data off status indicator for each access network technology type it uses or supports. The wireless device reports the MA PS Data off to the communication system when it requests access to the communication system using the corresponding access network. For instance, when the wireless device performs simultaneous access to the communication system over 3GPP access network and non-3GPP access network, it reports the MA PS Data off status indicator for exempting services from being blocked over the 3GPP access network and reports another MA PS Data off status indicator over the non-3GPP access network. The MA PS Data off status indicator indicates if the wireless device has enabled or disabled the capability of exempting services from being blocked over the particular access network. The MA PS Data off status indicator may have different values for different access networks.

The wireless device may change the MA PS Data off status from activate to inactivate on a per access network. The wireless device would report the change of the status indicator to the communication system, which may then stop exempting specific services from being blocked over that access network.

In an alternative embodiment, the wireless device may maintain a single or common MA PS Data off status indicator for all access network technology it uses or supports. The wireless device will then report the same value when accessing the communication system via each of the access network technology type it supports.

Method Embodiments in Network Entities of the Communication System

Figure 3:
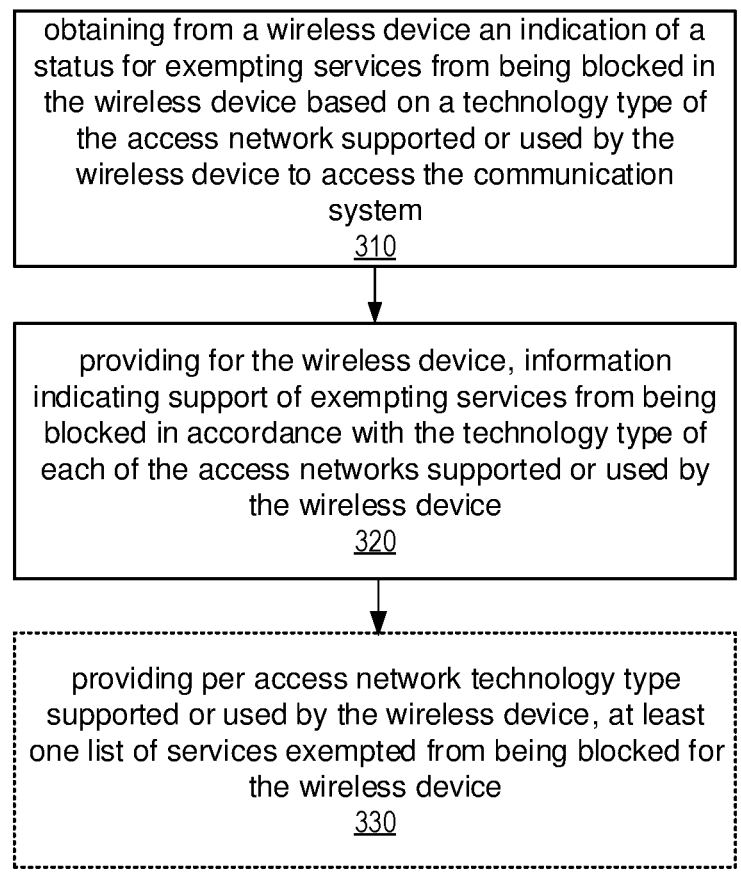
FIG. 3 is a flow chart illustrating a method in a control network entity controlling the MA PS Data off for the wireless device using 3GPP and non 3GPP access network types in accordance with some embodiments.

FIG. 3 illustrates example embodiments in a control network entity for controlling exempting services from being blocked in accordance with some embodiments. The method comprises the step 310 of obtaining from a wireless device the wireless device MA PS Data off status indicating if the wireless device has activated the capability to exempt services from being blocked over the corresponding access network used to access the communication system. If the control network entity is an MME, AMF/SMF or PGW-C that are control plane entities that manage user plane entities, the MA PS Data off status indicator may be received from the wireless device in a Registration Request or a Service Request or a Tracking Area Update or any other NAS message. If the control network entity is collocated with a user plane entity such as a PGW in EPC or an ePDG as specified in 3GPP TS 23.402 that supports access from untrusted non-3GPP access in 4G communication system, the wireless device MA PS Data off would be reported to those entities via various other non-NAS messages. The PGW would obtain the information, via other network entities such as MME and SGW, in a PDU session request or PDN connection request or equivalent.

The ePDG would obtain the MA PS Data off status indicator via IKEv2 messages from the wireless device using untrusted non-3GPP access to access the 4G communication system. IKE-AUTH Request message or other suitable IKEv2 message would be modified to transport the status indicator from the wireless device to the ePDG. The ePDG may then forward the received wireless device MA PS Data off indicator to a PGW. Similarly, the ePDG would need to transmit to the wireless device the corresponding network status indicator for MA PS Data off using a suitable IKEv2 message that would be modified. The ePDG may obtain the network status indicator for MA PS Data off from the PGW. The wireless device MA PS Data off status indicator indicating enabled is used to indicate the wireless device is able to exempt services from being blocked which may correspond to preventing uplink traffic flows for certain services/applications services from being blocked.

In a 5G communication system, the control network entity is an AMF/SMF. After receiving the wireless device MA PS Data off status indicator indicating the capability to exempt services from being blocked over the access network is activated, the control network entity may obtain from a subscriber profile server function, a policy control entity or a Session management entity, the network MA PS Data off status indicator indicating if the capability of exempting services from being blocked from the network side over the access network technology type used by the wireless device is enabled. If the wireless device has multiple simultaneous connections to the communication system over multiple access networks of different technology type, the control network entity for the wireless device stores the received wireless device MA PS Data off status indicator for each access network used by the wireless device and obtains a network MA PS Data off status indicator on a per access network.

The network MA PS Data off status indicator is then provided to the wireless device at step 320. The control network entity uses a NAS response message to provide the MA PS Data off status indicator to the wireless device. If the control network entity is for example in an ePDG entity, then IKEv2 message may be used to signal the network indicator to the wireless device. At step 330, if the control entity receives from the subscriber profile server profile or PCF one or more list of services to be exempted from being blocked from the wireless device for each access network technology type used by the wireless device, the control entity forwards the one or more list of services to be exempted to the wireless device.

The one or more list of services exempted from being blocked for each access network technology type further comprises a list of services exempted from being blocked in the Home Public Land Mobile Network, HPLMN and a list of services exempted from being blocked in a Visited PLMN, VPLMN. When a wireless device is simultaneously connected to the HPLMN over a non-3GPP access network technology and to a VPLMN over a 3GPP access network technology, different control network entities may be assigned in the communication system. The wireless device MA PS Data off and the network MA PS Data off is handled on an access network basis as well as the list(s) of MA PS Data off exempted services, which are maintained and provided on a per access network technology type.

Figure 4:
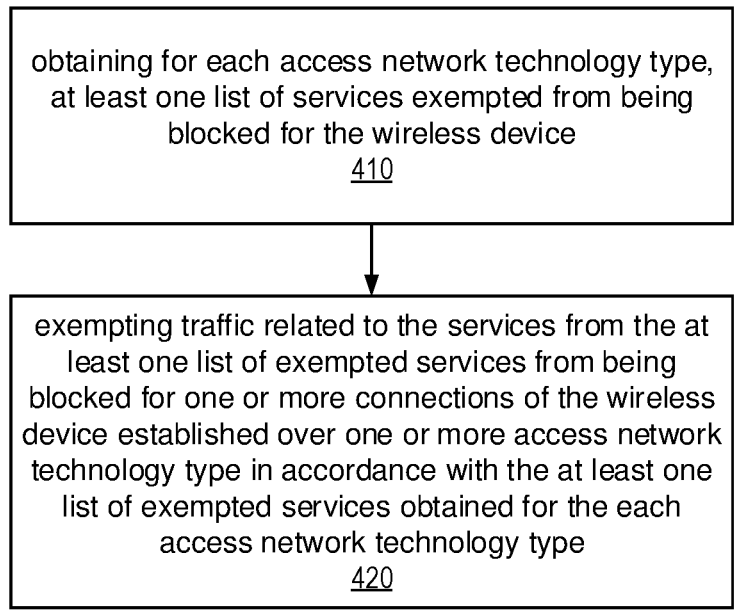
FIG. 4 is a flow chart illustrating a method in a user plane network entity for enforcing the traffic for a wireless device connected over 3GPP and non 3GPP access networks in accordance with the MA PS Data off list of exempted services in accordance with some embodiments.

FIG. 4 illustrates example embodiments in a user plane network entity for enforcing the exempted services from being blocked while blocking other services in accordance with some embodiments. The user plane entity may be a UPF in 5GC, or a PGW-U where the UPF is selected by the SMF and the PGW-U is selected by a PGW-C. The user plane network entities handle the user plane traffic to and from a wireless device to one or more PDNs that provide one or more services. The user plane network entity performs the step 410 of obtaining at least one list of exempted services for which traffic is allowed to be transmitted over a connection established for the wireless device that uses an access network technology type, whilst all other traffic corresponding to services not in the list is blocked over the access network used by the wireless device. The User plane network entity is thus configured with the necessary filter information corresponding to the list of exempted services from being blocked over the connection(s) established by the wireless device over the access network. If the wireless device has established simultaneous connection over 3GPP and non-3GPP access and both connections are anchored in the same user plane network entity, different lists of exempted services per access network type should be configured in the same user plane network entity. As the user plane network entity may not be aware of the access network technology type as it only routes IP traffic, other information indicating the exempted traffic routed over the access network should be used, such as the wireless device IP address included in the filter information, if different IP addresses are used over the different access networks. In the event the wireless device shares a common IP address across the simultaneous Access networks, an identification of the connection peer could be used to differentiate the traffic over the connections. The user plane network entity performs at step 420 enforcement of the list of exempted services by enforcing the filters resulting in allowing downlink traffic related to the exempted services configured in the user plane network entity to be transmitted to the wireless device over the one or more connections or session(s) established over one access network of a technology type, while blocking other non-exempted traffic related services.

If the wireless device is roaming and is simultaneously connected to a non-3GPP access to the HPLMN and to a VPLMN with home anchor in the HPLMN and both connections are anchored in the same user plane network entity in the home. The wireless device may be viewed as roaming over 3GPP access network and @home over non 3GPP access network. The one or more list of services exempted from being blocked for each access network technology type further comprises a list of services exempted from being blocked in the Home Public Land Mobile Network, HPLMN for the non-3GPP access network and a list of services exempted from being blocked in a Visited PLMN, VPLMN for the 3GPP access network. Different services may be exempted over the different access networks. Both the roaming status and the access network type affect the type of services to be exempted from being blocked.

If the user plane network entity includes a control component such as a legacy PGW specified in 3GPP TS 23.401, it may maintain the network MA PS Data off status indicator on a per access network technology type and when the request for a connection from the wireless device indicate the access network technology type, it provides for the wireless device the network MA PS Data off status indicator for the access network technology type and stores the received wireless device MA PS Data off status indicator.

Example Device, Apparatus Embodiments

Figure 5:
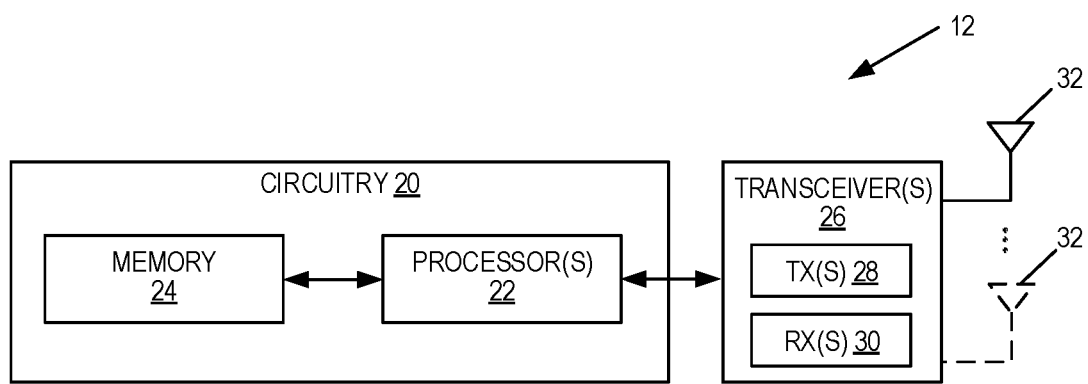
FIGS. 5 and 6 illustrate example block diagrams of a wireless device (e.g., UE) in accordance with some embodiments.

FIG. 5 is a schematic block diagram of the wireless device 12, or UE, according to some embodiments of the present disclosure. As illustrated, the wireless device 12 includes circuitry 20 comprising one or more processors 22 (e.g., Central Processing Units (CPUs), Application Specific Integrated Circuits (ASICs), Field Programmable Gate Arrays (FPGAs), Digital Signal Processors (DSPs), and/or the like) and memory 24. The wireless device 12 also includes one or more transceivers 26 each including one or more transmitters 28 and one or more receivers 30 coupled to one or more antennas 32. In some embodiments, the functionality of the wireless device 12 described herein may be implemented in hardware (e.g., via hardware within the circuitry 20 and/or within the processor(s) 22) or be implemented in a combination of hardware and software (e.g., fully or partially implemented in software that is, e.g., stored in the memory 24 and executed by the processor(s) 22).

In some embodiments, a computer program including instructions which, when executed by the at least one processor 22, causes the at least one processor 22 to carry out at least some of the functionality of the wireless device 12 according to any of the embodiments described herein is provided. In some embodiments, a carrier containing the aforementioned computer program product is provided. The carrier is one of an electronic signal, an optical signal, a radio signal, or a computer readable storage medium (e.g., a non-transitory computer readable medium such as memory).

Figure 6:
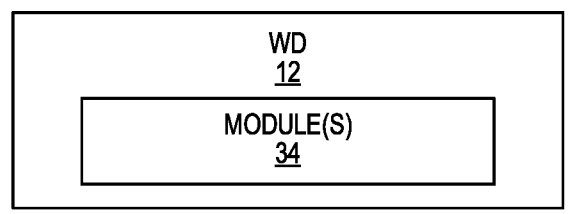

FIG. 6 is a schematic block diagram of the wireless device 12, or UE, according to some other embodiments of the present disclosure. The wireless device 12 includes one or more modules 34, each of which is implemented in software. The module(s) 34 provide the functionality of the wireless device 12 described herein (e.g., as described with respect to FIG. 1 and FIG. 2).

Figure 7:
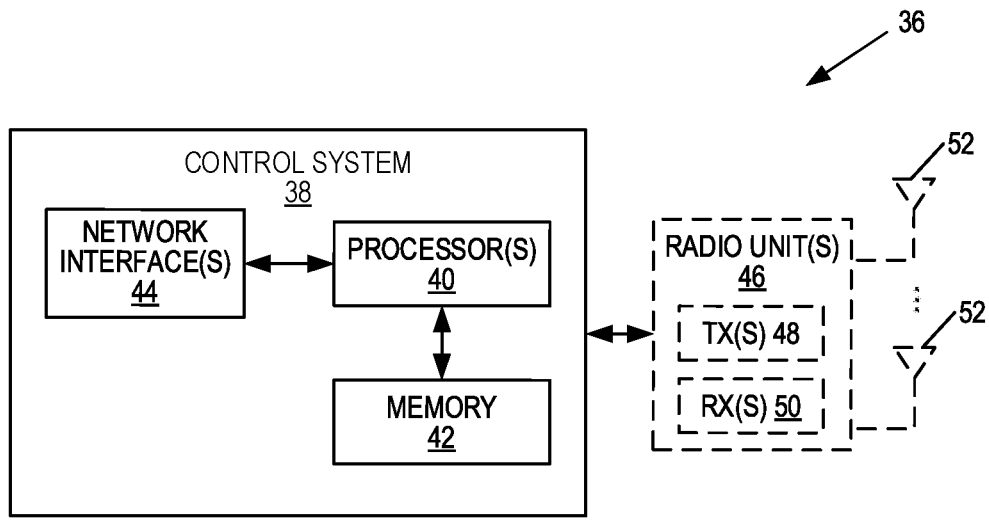
FIGS. 7 through 9 illustrate example embodiments of a network entity in accordance with some embodiments.

FIG. 7 is a schematic block diagram of a network node 36 (e.g., a core network node such as, for example, a MME or a PGW of an EPC or a node implementing an AMF and/or an SMF, a PCF, a UPF in the 5GC according to some embodiments of the present disclosure. As illustrated, the network node 36 includes a control system 38 that includes circuitry comprising one or more processors 40 (e.g., CPUs, ASICs, DSPs, FPGAs, and/or the like) and memory 42. The control system 38 also includes a network interface 44. In embodiments in which the network node 36 is a radio access node 14, the network node 36 also includes one or more radio units 46 that each include one or more transmitters 48 and one or more receivers 50 coupled to one or more antennas 52. In some embodiments, the functionality of the network node 36 (e.g., the functionality of the MME, AMF, SMF, CPF, UPF, PGW) described above may be fully or partially implemented in software that is, e.g., stored in the memory 42 and executed by the processor(s) 40.

Figure 8:
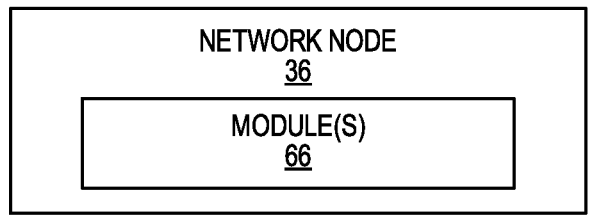

FIG. 8 is a schematic block diagram that illustrates a virtualized embodiment of the network node 36 (see FIG. 7) according to some embodiments of the present disclosure. As used herein, a "virtualized" network node 36 is a network node 36 in which at least a portion of the functionality of the network node 36 is implemented as a virtual component (e.g., via a virtual machine(s) executing on a physical processing node(s) in a network(s)). As illustrated, the network node 36 optionally includes the control system 38, as described with respect to FIG. 7. In addition, if the network node 36 is the radio access node 14, the network node 36 also includes the one or more radio units 46, as described with respect to FIG. 7. The control system 38 (if present) is connected to one or more processing nodes 54 coupled to or included as part of a network(s) 56 via the network interface 44. Alternatively, if the control system 38 is not present, the one or more radio units 46 (if present) are connected to the one or more processing nodes 54 via a network interface(s). Alternatively, all of the functionality of the network node 36 described herein may be implemented in the processing nodes 54. Each processing node 54 includes one or more processors 58 (e.g., CPUs, ASICs, DSPs, FPGAs, and/or the like), memory 60, and a network interface 62.

In this example, functions 64 of the network node 36 (e.g., the functions of the MME, AMF) described herein are implemented at the one or more processing nodes 54 or distributed across the control system 38 (if present) and the one or more processing nodes 54 in any desired manner. In some particular embodiments, some or all of the functions 64 of the network node 36 described herein are implemented as virtual components executed by one or more virtual machines implemented in a virtual environment(s) hosted by the processing node(s) 54. As will be appreciated by one of ordinary skill in the art, additional signaling or communication between the processing node(s) 54 and the control system 38 (if present) or alternatively the radio unit(s) 46 (if present) is used in order to carry out at least some of the desired functions. Notably, in some embodiments, the control system 38 may not be included, in which case the radio unit(s) 46 (if present) communicates directly with the processing node(s) 54 via an appropriate network interface(s).

In some particular embodiments, higher layer functionality (e.g., layer 3 and up and possibly some of layer 2 of the protocol stack) of the network node 36 may be implemented at the processing node(s) 54 as virtual components (i.e., implemented "in the cloud") whereas lower layer functionality (e.g., layer 1 and possibly some of layer 2 of the protocol stack) may be implemented in the radio unit(s) 46 and possibly the control system 38.

In some embodiments, a computer program including instructions which, when executed by the at least one processor 40, 58, causes the at least one processor 40, 58 to carry out the functionality of the network node 36 or a processing node 54 according to any of the embodiments described herein is provided. In some embodiments, a carrier containing the aforementioned computer program product is provided. The carrier is one of an electronic signal, an optical signal, a radio signal, or a computer readable storage medium (e.g., a non-transitory computer readable medium such as the memory 42, 60).

Figure 9:
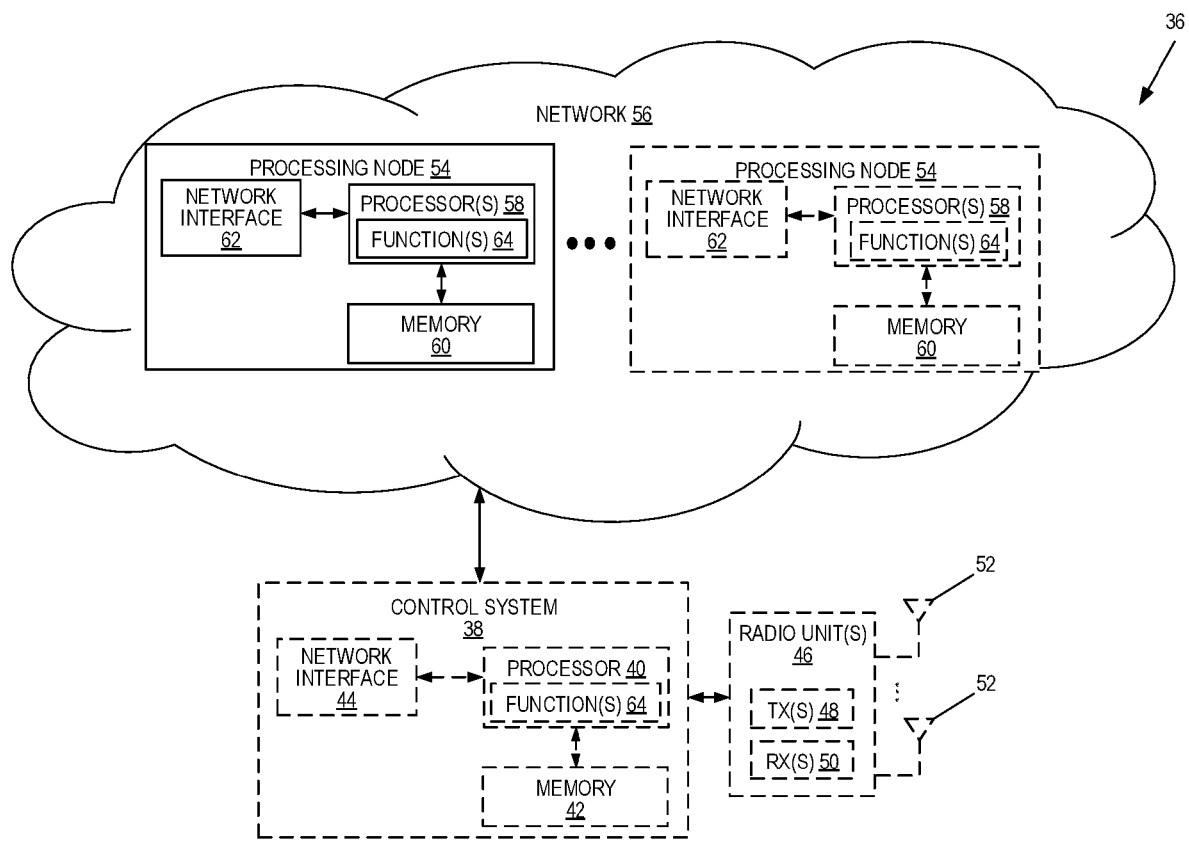

FIG. 9 is a schematic block diagram of the network node 36 according to some other embodiments of the present disclosure. The network node 36 includes one or more modules 66, each of which is implemented in software. The module(s) 66 provide the functionality of the network node 36 described herein (e.g., the functionality of a corresponding one of the network nodes described in relation to FIGS. 1, 3 and 4).

Example Embodiments

While not being limited thereto, some example embodiments of the present disclosure are provided below.

1. A method performed by a wireless device relating to determining exempted services from being blocked when accessing a communication system over one or more access network of different technology type, the method comprising:
   obtaining on a per access network technology type supported by the wireless device, one or more list of services exempted from being blocked; and
   providing to the communication system over each access network used by the wireless device, information indicating an activity status related to exempting services from being blocked in accordance with the technology type of each of the access network used by the wireless device.

2. The method of embodiment 1, wherein the method further comprises connecting to the communication systems simultaneously over more than one access network of different technology type.

3. The method of embodiments 1 and 2, wherein providing information indicating an activity status for services related to exempting services from being blocked further comprises indicating whether the wireless device has enabled or disabled a capability to exempt services from being blocked over the access network technology type.

4. The method of embodiment 1 wherein the one or more list of exempted services comprises a list of services exempted from being blocked for each access network of different technology type supported by the wireless device and to be applied when the wireless device is connected to the communication system in a Home Public Land Mobile Network, HPLMN.

5. The method of embodiment 1 wherein the one or more list of exempted services comprises a list of exempted services to be applied for each access network of different technology type supported by the wireless device and to be applied when the wireless device is connected to the communication system in a Visited Public Land Mobile Network, VPLMN.

6. The method of embodiments 2 to 5, wherein connecting to the communication system further comprises simultaneously connecting to the HPLMN over one access network of a first technology type and to a VPLMN over a different access network of a different technology type.

7. The method of embodiment 2-6 wherein the one access network is a 3GPP access network and the different access network is a non-3GPP access network.

8. The method of embodiment 7 wherein the non-3GPP access network is a Wireless Lan Network, WLAN.

9. A wireless device adapted to perform the method of any one of embodiments 1 to 8.

10. A wireless device, comprising:
    one or more transceivers (26); and
    circuitry (20) connected to the one or more transceivers (26), the circuitry (20) operable to cause the wireless device (12) to perform the method of any one of embodiments 1 to 8.

11. A wireless device (12), comprising:
    one or more modules (34) operable to perform the method of any one of embodiments 1 to 8.

12. A method of operation of a user plane network entity in a communication system of enforcing use of services, the method comprising:
    obtaining for each access network technology type, at least one list of services exempted from being blocked for the wireless device; and
    exempting traffic related to the services from the at least one list of exempted services from being blocked for one or more connections of the wireless device established over one or more access network technology type in accordance with the at least one list of exempted services obtained for each of the access network technology type.

13. The method of embodiment 12, further comprising providing for a wireless device, information indicating an activity status related to exempting services from being blocked in accordance with the technology type of each of the access networks supported by the wireless device.

14. The method of embodiment 12, obtaining on a per access network technology type at least one list of services exempted from being blocked further comprises obtaining on a per access network technology type a list of services exempted from being blocked in the Home Public Land Mobile Network, HPLMN and a list of services exempted from being blocked in a Visited PLMN, VPLMN.

15. The method of embodiments 12 and 14, further comprising providing for the wireless device at initial attach the at least one list of services to be exempted from being blocked on a per access network technology type.

16. The method of embodiment 12 wherein enforcing exemption of the services from being blocked in accordance with the access network technology type further comprises:
    detecting at least one of service data flow or service type corresponding to a service to be exempted for an access network technology type used by the wireless device, and
    allowing the traffic related to the service to be transmitted to the wireless device over the corresponding access network and blocking any traffic over the access network that does not correspond to any service in the list of services to be exempted from being blocked for the access network technology type.

17. A user plane network node in a communication system adapted to perform the method of any one of embodiments 12 to 16.

18. A user plane network node in a communication system, comprising:
    a network interface (44, 62);
    one or more processors (40, 58); and
    memory (42, 60) comprising instructions executable by the one or more processors (40, 58) whereby the user plane network node is operable to perform the method of any one of embodiments 12 to 16.

19. A user plane network node in a communication system comprising:
    one or more modules (66) operable to perform the method of any one of embodiments 12 to 16.

20. A method of operation of a control network entity in a communication system of controlling use of services, the method comprising:
    obtaining from a wireless device an indication of a status for exempting services from being blocked in the wireless device based on a technology type of the access network supported or used by the wireless device to access the communication system; and
    providing for the wireless device, information indicating support of exempting services from being blocked in accordance with the technology type of each of the access networks supported or used by the wireless device.

21. The method of embodiment 20 further comprising providing per access network technology type supported or used by the wireless device, at least one list of services exempted from being blocked for the wireless device.

22. The method of embodiment 21 wherein the at least one list of services exempted from being blocked further comprises a list of services exempted service from being blocked in the Home Public Land Mobile Network, HPLMN, and a list of services exempted from being blocked in a Visited PLMN, VPLMN.

23. A control network node in a communication system adapted to perform the method of any one of embodiments 21 to 22.

24. A control network node in a communication system, comprising:
    a network interface (44, 62);
    one or more processors (40, 58); and
    memory (42, 60) comprising instructions executable by the one or more processors (40, 58) whereby the control network node is operable to perform the method of any one of embodiments 21 to 22.

25. A control network node in a communication system comprising:
    one or more modules (66) operable to perform the method of any one of embodiments 21 to 22.

26. A computer program comprising instructions which, when executed on at least one processor, cause the at least one processor to carry out the method according to any one of embodiments 1 to 8.

27. A carrier containing the computer program of embodiment 26, wherein the carrier is one of an electronic signal, an optical signal, a radio signal, or a computer readable storage medium.

28. A computer program comprising instructions which, when executed on at least one processor, cause the at least one processor to carry out the method according to any one of embodiments 12 to 16.

29. A carrier containing the computer program of embodiment 28, wherein the carrier is one of an electronic signal, an optical signal, a radio signal, or a computer readable storage medium.

The following acronyms are used throughout this disclosure.

| | |
|---|---|
| 3GPP | Third Generation Partnership Project |
| 5G | Fifth Generation |
| AMF | Access and Mobility Management Function |
| ASIC | Application Specific Integrated Circuit |
| CIoT | Cellular Internet of Things |
| CP | Control Plane |
| CPU | Central Processing Unit |
| DSP | Digital Signal Processor |
| EPC | Evolved Packet Core |
| EPS | Evolved Packet System |
| EUTRAN | Evolved Universal Terrestrial Radio Access Network |
| FPGA | Field Programmable Gate Array |
| HPLMN | Home Public Land Mobile Network |
| HSS | Home Subscriber Server |
| IoT | Internet of Things |
| IMS | IP multimedia Services |
| LTE | Long Term Evolution |
| MA | Multi-Access |
| MM | Mobility Management |
| MME | Mobility Management Entity |
| MTC | Machine Type Communication |
| NAS | Non Access Stratum |
| NB-IoT | Narrowband Internet of Things |
| NR | New Radio |
| PCF | Policy control function |
| PS | Packet Switched |
| PGW | Packet Data Network Gateway |
| PGW-C | PGW Control plane |
| PGW-U | PGW User plane |
| RAN | Radio Access Network |
| RAT | Radio Access Technology |
| SIP | Session Initiation Protocol |
| SMF | Session Management Function |
| SMS | Short Message Service |
| TR | Technical Report |
| TS | Technical Specification |
| UDM | Unified Data Management |
| UE | User Equipment |
| UP | User Plane |
| USSD | Unstructured Supplementary Service Data |
| USSI | USSD using IMS |
| VPLMN | Visited Public Land Mobile Network |
| WD | Wireless Device |
| WLAN | Wireless Local Area Network |
| XCAP | XML Configuration Access Protocol |

Those skilled in the art will recognize improvements and modifications to the embodiments of the present disclosure. All such improvements and modifications are considered within the scope of the concepts disclosed herein.

The invention claimed is:

1. A wireless device, comprising:
   one or more transceivers; and
   circuitry connected to the one or more transceiver, the circuitry operable to cause the wireless device to
   provide, to a network node, information indicating an activity status related to exempting services from being blocked for each of a 3GPP and a non-3GPP access network used by the wireless device; and
   obtain one or more list of services exempted from being blocked for the at least one of the 3GPP and the non-3GPP access network.

2. A method of operation of a user plane network entity in a communication system of enforcing services for a wireless device, the method comprising:
   obtaining for each 3GPP and non-3GPP access network type used by the wireless device, at least one list of services exempted from being blocked;
   receiving downlink traffic for the wireless device;
   determining whether the downlink traffic is to be transmitted over the 3GPP or the non-3GPP access network type used by the wireless device;
   upon determining that the downlink traffic corresponds to a service exempted from being blocked for the determined access network type according to the obtained list of services for the determined access network type, transmitting the traffic to the wireless device over the determined access network type; and
   upon determining that the downlink traffic corresponds to a service that is not exempted from being blocked for the determined access network type, blocking the traffic from being transmitted to the wireless device over the determined access network type.

3. The method of claim 2, wherein said obtaining for each of the 3GPP and non-3GPP access network type at least one list of services exempted from being blocked further comprises obtaining on a per access network type a list of services exempted from being blocked in the Home Public Land Mobile Network, HPLMN and a list of services exempted from being blocked in a Visited PLMN, VPLMN.

4. The wireless device of claim 1, wherein the circuitry is further operable to cause the wireless device to obtain at initial attach procedure or packet data session establishment procedure the one or more list of services exempted from being blocked per access network type.

5. The method of claim 2 wherein said determining that the downlink traffic corresponds to a service further comprises detecting at least one of a service data flow or a service type corresponding to a service by applying configured traffic filters.

6. A method of operation of a control network entity in a communication system of controlling use of services, the method comprising:
   obtaining from a wireless device that is simultaneously connected over a 3GPP and a non-3GPP access network, an indication of a status in exempting services from being blocked for each of the 3GPP and non-3GPP access network used by the wireless device; and
   sending to the wireless device, information indicating support of exempting services from being blocked in the communication system for each of the 3GPP and non-3GPP access networks used by the wireless device.

7. The method of claim 6 further comprising providing for each of the 3GPP and non-3GPP access network used by the wireless device, at least one list of services exempted from being blocked for the wireless device.

8. The method of claim 7 wherein the at least one list of services exempted from being blocked further comprises a list of services exempted from being blocked in the Home Public Land Mobile Network, HPLMN, and a list of services exempted from being blocked in a Visited PLMN, VPLMN.

9. The wireless device of claim 1, wherein the information indicating the activity status corresponds to an indication of whether the wireless device has enabled or disabled a capability to exempt services from being blocked over each of the 3GPP and non-3GPP access network.

10. The wireless device of claim 1 wherein the one or more list of exempted services for the at least one of the 3GPP and the non-3GPP access network comprises a list of services exempted from being blocked that is applied when the wireless device is connected to the communication system in a Home Public Land Mobile Network, HPLMN.

11. The wireless device of claim 1 wherein the one or more list of exempted services for the at least one of the 3GPP and the non-3GPP access network comprises a list of services exempted from being blocked to be applied when the wireless device is connected to the communication system in a Visited Public Land Mobile Network, VPLMN.

12. The wireless device of claim 11, wherein the wireless device is simultaneously connected to the HPLMN over one of the 3GPP or the non-3GPP access network and to a VPLMN over the other one of the 3GPP or the non-3GPP access network.

13. The wireless device of claim 1 wherein the non-3GPP access network is a Wireless Lan Network, WLAN.

* * * * *